C. O. KEAGY.
PIVOT JOINT.
APPLICATION FILED MAY 22, 1920.

1,387,989.

Patented Aug. 16, 1921.

WITNESSES
J. Herbert Bradley

INVENTOR
Charles O Keagy
by Winter & Brown
his attorneys

UNITED STATES PATENT OFFICE.

CHARLES O. KEAGY, OF PITCAIRN, PENNSYLVANIA.

PIVOT-JOINT.

1,387,989.  Specification of Letters Patent.  Patented Aug. 16, 1921.

Application filed May 22, 1920. Serial No. 383,542.

*To all whom it may concern:*

Be it known that I, CHARLES O. KEAGY, a resident of Pitcairn, in the county of Allegheny and State of Pennsylvania, have invented a new and useful Improvement in Pivot-Joints, of which the following is a specification.

The object of the invention is to provide a pivot joint in which the pivot pin may be readily inserted and quickly locked securely against withdrawal.

Figure 1:
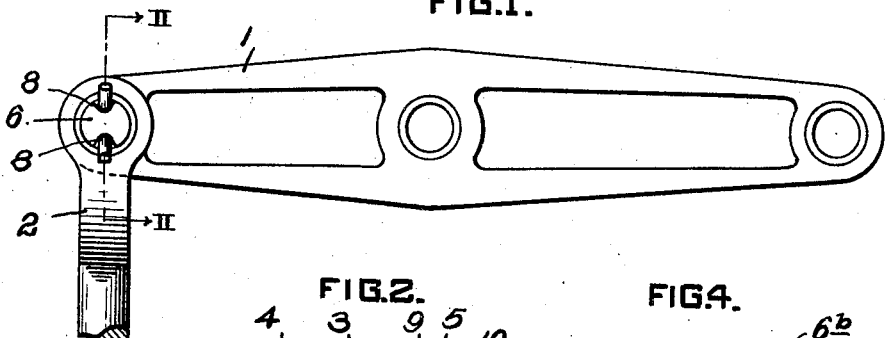
Figure 1:
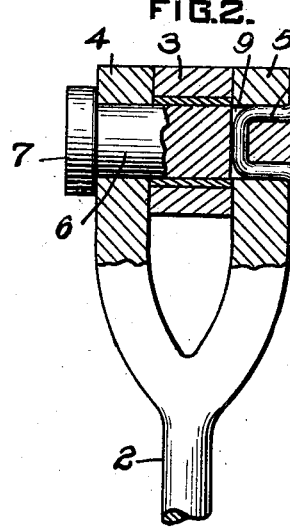
Figure 1:
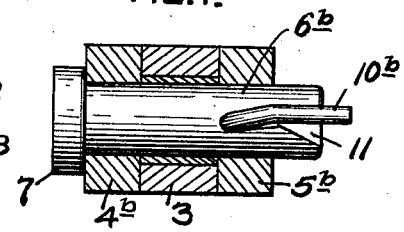
Figure 1:
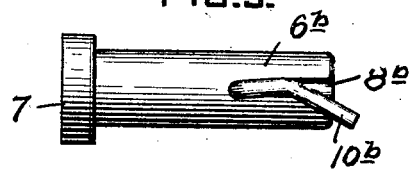
Figure 1:
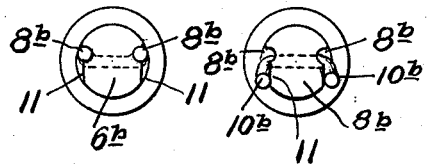
Figure 1:
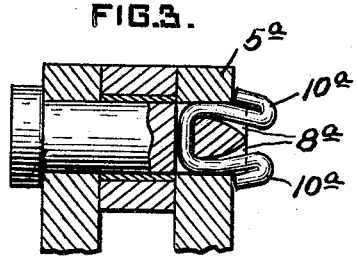

While the invention is applicable to pivot joints for various purposes, it is illustrated herein in its adaptability to a pivot connection between a brake lever and a connecting or operation rod. In the drawings, Figure 1 is a side view of a brake lever and rod pivotally connected to each other; Fig. 2 a sectional view to enlarged scale taken on the line II—II, Fig. 1; Figs. 3 and 4 views similar to Fig. 2 showing modifications of construction; Fig. 5 a view of the pivot pin of Fig. 4 with the locking member in a different position than is indicated in Fig. 4; and Figs. 6 and 7 right end views of the locking pin as viewed in Figs. 4 and 5, respectively.

Referring first to the embodiment of the invention illustrated in Figs. 1 and 2, the brake lever 1 and the rod 2 are provided at their ends with registering eyes, the brake lever having a single eye 3, and the rod being forked and provided with a pair of eyes 4 and 5 disposed on opposite sides of the brake lever eye. These several eyes register with each other, and through them there extends a pivot pin 6 which may be provided with a head 7.

To effectually lock the pivot pin against being withdrawn, the side of the pin adjacent to its outer end is provided with a longitudinal extending groove which communicates with an opening extending into the body of the pin. In the groove there is placed a strip of bendable metal, one end of which extends into the opening of the pin, and the other end of which is turned outwardly to lock the pin.

As particularly illustrated in Figs. 1 and 2, the pivot pin is preferably provided with two longitudinal extending grooves arranged on opposite sides of the pins and indicated by the numeral 8, and the transverse opening, indicated at 9, extends through the pin from the inner end of one to the inner end of the other groove. So as not to materially weaken the pin, the opening 9 is preferably so located as to lie within the eye 5, as indicated in the drawings. The bendable strip of metal when assembled with the pin, is preferably of general U-shape extending continuously from one groove 8 through the opening into the other groove 8, the outermost portions of the strip lying within the cylindrical bounds of the surface of the pin so that the pin may be readily inserted in the eyes of the pivotally connected members. The outer ends of the strip are turned outwardly, and in such position lock the pin firmly in place. The strip 10 may be made of iron, lead, brass or any other metal which may readily be inserted in the pin opening 9 and bent to lie in the grooves 8 and to have its ends turned laterally.

If desired, the locking strip may, as indicated in Fig. 3, be given a larger bend, both for the purpose of more securely locking the pin and for the further purpose of giving the construction a workmanlike appearance. As indicated in such figure, the outer ends of the grooves 8$^a$ converge toward each other, and the outer ends of the strip 10$^a$ are bent through an angle of approximately 180°, so that such ends bear upon the outer face of the eye 5$^a$.

In the embodiment of the invention illustrated in Figs. 4–7, the outer ends of the grooves 8$^b$ communicate with inclined laterally disposed recesses 11 which at the outer end of the pin are of less depth than the grooves 8$^b$. When the pivot pin is inserted in the eyes of the members pivotally connected to each other, the side portions of the bendable strip 10$^b$ lie entirely in the grooves 8$^b$, as particularly indicated in Figs. 4 and 6. After the pin has been inserted, the outer ends of the strip are turned outwardly and laterally until they lie in the recesses 11, with the result that the ends of the strip are firmly retained in their pin-locking positions.

By providing pivot pins with a lock constructed according to this invention, it becomes unnecessary to attach a locking member to the pin after the pin has been placed in the eyes of the members pivoted to each other. In other words, the pin lock is, in the present construction, assembled with the pin before the joint is assembled, and to lock the pin in position it is only necessary to bend the outer ends of the bendable strip, which, depending somewhat upon the size of the strip and the metal of which it is made, may be done by hand or by striking the ends of the strip a blow with the hammer. Thus the liability of a workman inadvertently failing to lock a pin in position is diminished.

According to the provisions of the patent statute, I have described the principle and operation of my invention, together with several embodiments thereof. However, I desire to have it understood that, within the scope of the appended claims, my invention may be practised by other forms of construction than those specifically shown and described herein.

I claim:

1. In a pivot joint, the combination of a pair of members provided with registering eyes, a pivot pin extending through said eyes and having a pair of oppositely-disposed longitudinally-extending grooves in its side and a transverse opening through the pin from the inner end of one to the inner end of the other of said grooves, and a strip of bendable metal lying in said grooves and opening and having its ends turned outwardly to lock the pin in the eyes of said members.

2. In a pivot joint, the combination of a pair of members provided with registering eyes, a pivot pin extending through said eyes and having a groove in its side extending longitudinally from the end of the pin and having an inwardly extending opening communicating with the inner end of said groove, the side of the pin being further provided at its end with a recess at one side of but of less depth than said groove, and a strip of bendable metal in said groove and having its inner end extending into said opening and its outer end lying in said recess to lock the pin in the eyes of said members and to lock the outer end of the strip against bending into alinement with said groove.

3. In a pivot joint, the combination of a pair of members one of which is provided with a pair of eyes having an intervening space between them and the other of which is provided with an eye lying in said space, a pivot pin extending through said several eyes and having adjacent to its end a pair of oppositely - disposed longitudinally - extending grooves in its side and having a transverse opening through the pin from the inner end of one to the inner end of the other of said grooves and entirely within the plane of the eye nearest to the end of the pin, and a strip of bendable metal lying in said grooves and opening and having its ends turned outwardly to lock the pin in the eyes of said members.

In testimony whereof, I have hereunto set my hand.

CHARLES O. KEAGY.

Witnesses:
   FREDERIC SCHAEFER,
   SUE B. FRITZ.